(12) United States Patent
Berg

(10) Patent No.: US 10,625,362 B2
(45) Date of Patent: *Apr. 21, 2020

(54) WELDING APPARATUS AND A METHOD FOR WELDING

(71) Applicant: ESAB AB, Gothenburg (SE)

(72) Inventor: Michael Berg, Laxa (SE)

(73) Assignee: ESAB AB, Gotenborg (SE)

( * ) Notice: Subject to any disclaimer, the term of this patent is extended or adjusted under 35 U.S.C. 154(b) by 1154 days.

This patent is subject to a terminal disclaimer.

(21) Appl. No.: 14/883,904

(22) Filed: Oct. 15, 2015

(65) Prior Publication Data

US 2016/0031034 A1    Feb. 4, 2016

Related U.S. Application Data

(63) Continuation of application No. 13/876,858, filed as application No. PCT/EP2010/064499 on Sep. 29, 2010, now Pat. No. 9,216,470.

(51) Int. Cl.
| | |
|---|---|
| *B23K 9/173* | (2006.01) |
| *B23K 9/24* | (2006.01) |
| *B23K 9/12* | (2006.01) |
| *B23K 9/18* | (2006.01) |

(52) U.S. Cl.
CPC ............ *B23K 9/1735* (2013.01); *B23K 9/122* (2013.01); *B23K 9/125* (2013.01); *B23K 9/188* (2013.01); *B23K 9/24* (2013.01)

(58) Field of Classification Search
CPC ........ B23K 9/1735; B23K 9/125; B23K 9/24; B23K 9/188; B23K 9/122
See application file for complete search history.

(56) References Cited

U.S. PATENT DOCUMENTS

| | | | |
|---|---|---|---|
| 396,270 A * | 1/1889 | Coffin | B23K 33/004 |
| 2,868,956 A * | 1/1959 | Lobosco | B23K 9/0678 |
| | | | 219/137 PS |
| 3,102,947 A * | 9/1963 | Blackman | B23K 9/1336 |
| | | | 219/137.52 |

(Continued)

FOREIGN PATENT DOCUMENTS

| | | |
|---|---|---|
| AU | 2010361319 B2 | 4/2012 |
| DE | 1965777 A1 | 7/1971 |

(Continued)

OTHER PUBLICATIONS

Machine translation of Japan Patent No. JP-05337,650, Feb. 2019.*

(Continued)

*Primary Examiner* — Geoffrey S Evans
(74) *Attorney, Agent, or Firm* — Edell, Shapiro & Finnan, LLC

(57) ABSTRACT

A twin wire welding apparatus including a first contact tube for guiding a first consumable electrode toward a weld puddle and transferring welding current to the first consumable electrode, a second contact tube for guiding a second consumable electrode toward said weld puddle and transferring welding current to the second consumable electrode, and a single power source connected to said first and second contact tubes for providing the same potential to said two consumable electrodes, and a method for operating such an apparatus.

35 Claims, 9 Drawing Sheets

(56) References Cited

U.S. PATENT DOCUMENTS

| | | | |
|---|---|---|---|
| 3,493,716 A * | 2/1970 | Joseph | B23K 9/0288 219/60.2 |
| 3,617,690 A | 11/1971 | Terai et al. | |
| 3,778,580 A * | 12/1973 | Bierwith | B23K 9/04 219/73.1 |
| 4,493,971 A * | 1/1985 | Nawa | B23K 9/167 219/136 |
| 4,791,271 A * | 12/1988 | Thompson | B23K 9/1336 140/147 |
| 4,806,735 A | 2/1989 | Ditschun et al. | |
| 5,155,330 A | 10/1992 | Fratiello et al. | |
| 5,994,659 A * | 11/1999 | Offer | B23K 9/1093 219/136 |
| 6,040,545 A | 3/2000 | Taki et al. | |
| 6,683,279 B1 | 1/2004 | Moerke | |
| 6,884,959 B2 | 4/2005 | Gandy et al. | |
| 7,381,923 B2 * | 6/2008 | Gordon | B23K 9/123 219/137.61 |
| 2009/0188894 A1 * | 7/2009 | Baughman | B23K 26/34 219/69.15 |

FOREIGN PATENT DOCUMENTS

| | | | | |
|---|---|---|---|---|
| DE | 2107617 A1 | | 8/1972 | |
| EP | 2193869 A1 | * | 6/2010 | ............... B23K 9/02 |
| FR | 2684032 A1 | * | 5/1993 | ........... B23K 9/0026 |
| GB | 1400051 A | | 7/1975 | |
| JP | 63-137043 A | | 11/1978 | |
| JP | 58168479 A | * | 10/1983 | ............. B23K 9/188 |
| JP | 59021468 A | | 2/1984 | |
| JP | 62054578 A | * | 3/1987 | |
| JP | 02205267 A | * | 8/1990 | |
| JP | 05337650 A | * | 12/1993 | |
| JP | H08-224667 A | | 9/1996 | |
| JP | 08323469 A | * | 12/1996 | |
| JP | 10-156532 A | | 6/1998 | |
| JP | 11-226736 | | 8/1999 | |
| JP | 2001-138053 A | | 5/2001 | |
| JP | 2007030019 A | * | 2/2007 | |
| JP | 2010-082624 A | | 4/2010 | |
| JP | 2010082624 A | * | 4/2010 | |
| JP | 2010-155281 A | | 7/2010 | |
| JP | 2013530583 A | | 7/2013 | |
| RU | 2049620 C1 | | 12/1995 | |
| RU | 2013119669 A | | 9/2010 | |
| SU | 859077 A | | 8/1981 | |
| SU | 1459849 A1 | | 2/1989 | |
| WO | WO-2010112068 A1 | * | 10/2010 | ............. B23K 9/122 |

OTHER PUBLICATIONS

Machine translation of France Patent No. 2,684,032, Feb. 2019.*
Machine translation of Japan Patent No. JP-2010082624, Feb. 2019.*
Machine translation of Japan Patent No. 02-205,267A, Aug. 2019.*
Machine translation of Japan Patent No. 2007-030,019A, Aug. 2019.*
Singapore Written Opinion in corresponding Application No. 201302175-3, dated Feb. 21, 2014, 10 pages.
Korean Office Action in corresponding Korean Application No. 10-2013-7010728, 10 pages.
Japanese Office Action in corresponding Japanese Application No. 2013-530583, dated Mar. 25, 2014, 8 pages.
Australian Patent Examination Report No. 1 in corresponding Application No. 2010361319, dated Oct. 15, 2013, 4 pages.
Australian Patent Examination Report No. 2 in corresponding Application No. 2010361319, dated Apr. 3, 2014, 3 pages.
International Preliminary Report on Patentability in corresponding International Application No. PCT/EP2010/064499, date of completion Oct. 23, 2012, 10 pages.

* cited by examiner

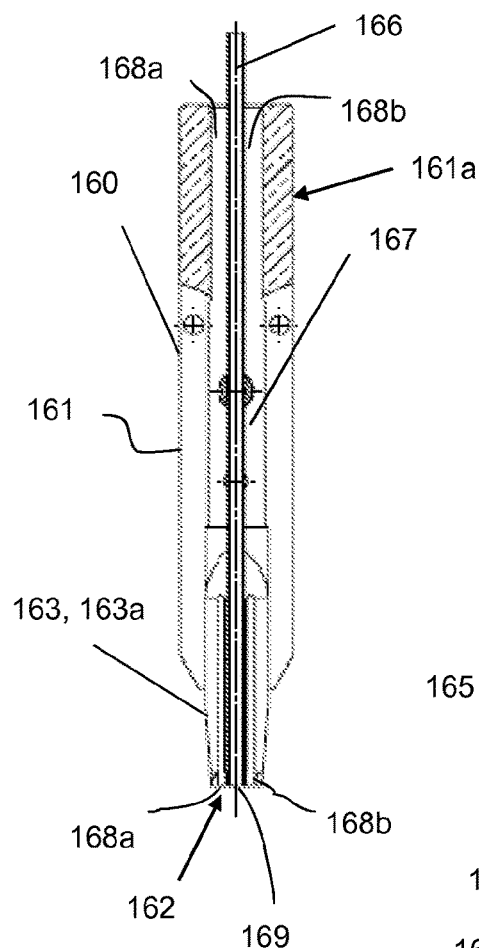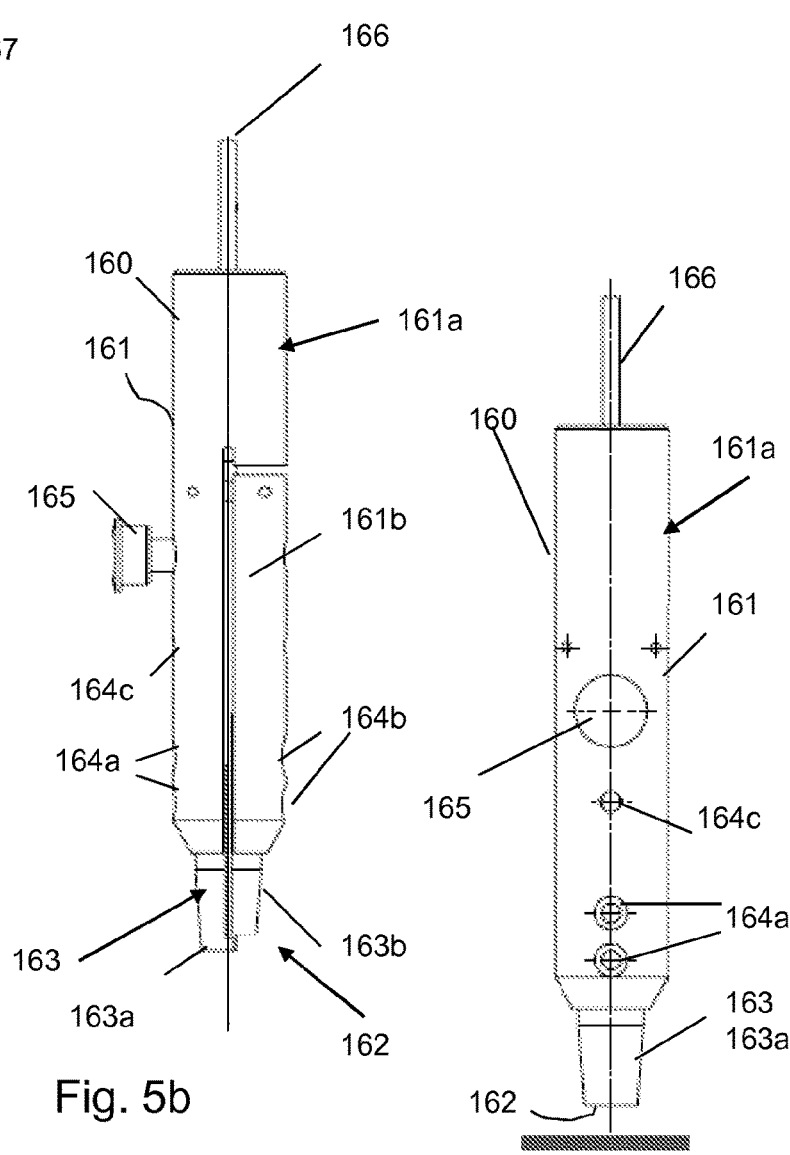
Fig. 5a
Fig. 5b
Fig. 5c

WELDING APPARATUS AND A METHOD FOR WELDING

CROSS REFERENCE TO RELATED APPLICATION

This application is a continuation of U.S. non-provisional patent application Ser. No. 13/876,858, filed Apr. 5, 2013, and now issued as U.S. Pat. No. 9,216,470, which is a 371 application based on International Application No. PCT/EP2010/064499, the entireties of which references are hereby incorporated by reference.

FIELD OF THE INVENTION

The present disclosure relates to a welding apparatus and to a welding method. In particular the invention relates to a welding apparatus for performing twin wire welding where at least two consumable electrodes are connected to a single power source. The at least two consumable electrodes are connected to an output providing the same potential to said at least two consumable electrodes. The invention further relates to a twin wire welding method for such a twin wire welding apparatus.

BACKGROUND OF THE INVENTION

Welding methods and welding apparatuses are continuously being developed for achieving higher deposition rates at maintained or improved weld quality. One way of increasing deposition rates is to use a plurality of electrodes operating in a single welding process in a single weld puddle. Use of a plurality of welding electrodes in a single weld puddle requires that the electrodes are located in a close proximity to each other. Close arrangement of electrodes will however lead to interaction between magnetic fields generated by each electrode. This may result in distorted welds.

Two different approaches for using a plurality of welding electrodes in a single welding process are known, tandem and twin welding.

In tandem welding each electrode is powered via a separate power source. Tandem welding may be advantageous in many applications since the control of power supply to each electrode is facilitated. In tandem welding, the magnetic interference between electrodes may be reduced by supplying phase shifted welding currents to the electrodes. This may be accomplished by conventional Scott-coupled power sources or by use of complex power sources, such as high frequency converters, for instance.

Since tandem welding requires the presence of two separate power sources, tandem welding apparatuses tend to be expensive and bulky. Hence, for some applications, such as welding in constrained spaces, twin welding may be a preferred or only possible solution.

In contrast, in twin welding a single power source is used for feeding a welding current to the electrodes. An advantage of twin welding methods is that the deposition rate may be increased for a given amount of power input. In twin welding methods, the use of more than one electrode allows for reduction in electrode diameter, which in turn increases the current density for each electrode. The increased current density allows for increased pre-heating of the electrode, hence a higher deposition rate can be maintained at less heat transfer to the weld puddle.

In early twin machines, such as for example disclosed in DE2107617, twin welding processes were enabled by arranging the feed current rectification to be applied such that one arc is supplied with positive and the other by the negative half wave current. Such arrangements led to severe interaction between the electrodes. In order to reduce the problem with interaction, the electrodes had to be positioned at a relatively large distance from each other, making it difficult to allow both electrodes to operate in the same weld puddle. If separation of the welding processes for each electrode takes place the weld process will be deteriorated.

In order to allow for closer positioning of the electrodes to ensure that both electrodes may operate in the same weld puddle, it has been suggested to supply twin wires through a common an electrically conductive contact element which ensures that both wires assumes the same potential. An example of this type of twin wire welding arrangement is disclosed in U.S. Pat. No. 5,155,330.

Even though twin welding methods, where consumable electrodes are fed through a common electrically conductive contact element to ensure that both wires assumes the same potential, has shown to be beneficial for both gas metal arc welding methods and submerged arc welding methods, further improvements are desirable in order to improve weld quality as well as to increase the deposition rate in the welding process.

SUMMARY OF THE PREFERRED EMBODIMENTS

An object of the present disclosure is thus to provide a twin wire welding apparatus where the at least two consumable electrodes are connected to a single output providing the same potential, which twin wire welding apparatus enables improvement of weld quality and an increased deposition rate.

Another object of the present disclosure is to provide a twin wire welding method where the at least two consumable electrodes are connected to a single output providing the same potential, which twin wire welding method enables improvement of weld quality and an increased deposition rate.

The inventive twin wire welding apparatus includes a first contact tube for guiding a first consumable electrode toward a weld puddle and transferring welding current to the first consumable electrode, a second contact tube for guiding a second consumable electrode toward said weld puddle and transferring welding current to the second consumable electrode. The twin wire welding apparatus may include more than two contact tubes for enabling twin welding with more than two consumable electrodes. The first and second contact tubes may be formed in a single contact tip as two parallel lead-throughs in the contact tip, through which the consumable electrodes are forced to enable contact between the power source and the consumable electrode. An arrangement of preferably parallel contact tubes may be arranged in a single contact tip, or alternatively may be arranged in separate contact tips. The arrangement with more than one contact tube in a single contact tip facilitates parallel arrangement of the consumable electrodes at a close distance, while the use of separate contact tips for housing the contact tubes facilitates arrangement of the contact tubes at an angle with respect to each other.

With separate contact tips it is intended that the contact tips are not formed as a monolithic conducting structure containing all the contact tubes. Instead, there is provided a plurality of separate contact tips, each housing a single contact tube. In the event separate contact tips are used, they will be electrically connected to enable all the consumable electrodes to assume the same potential when connected to a single power source. The electrical connection can be provided at the contact tips, at the power source, or anywhere in between the contact tip and power source.

The single power source is connected to said first and second contact tubes. This may be achieved by a suitable conductor, such as a cable, connecting the power supply with the contact tube. Hence, welding current will be distributed from the power source to the respective consumable electrode via the contact tubes.

According to the invention, the twin wire welding apparatus further includes a feeding arrangement for feeding a cold wire into a weld puddle formed by arcs created by the first and second consumable electrodes.

The introduction of a cold wire into the weld puddle will enable cooling of the weld puddle to maintain the weld puddle at a desired temperature. Reduction of weld puddle temperature may result in alloy additives being vaporized to a lesser extent in a zone directly affected by the arcs from the consumable electrodes. This may lead to improved control of the composition of the weld alloy, which may lead to improved welds. For the purpose of reducing the peak temperatures in the weld puddle, as well as maintaining a relatively high deposition rate from the cold wire, it is preferable to introduce the cold wire in the vicinity of the arc, preferably in the arc from at least one of the consumable wires. Furthermore, feeding of a cold wire into the weld puddle may lead to an increase in deposition rate above 20%, with a prospect to an increase of productivity of almost 50% with optimized welding parameters. The invention allows for higher deposition rates without increasing the welding speed. Expediently, the invention allows for retrofitting existing welding systems, particularly for welding of large workpieces such as pipe-mills.

According to the present disclosure is the feeding arrangement for said cold wire is arranged to feed said cold wire essentially orthogonally into said weld puddle. It has been discovered that oblique introduction of the cold electrode, that is when the cold wire is fed into the weld puddle at an angle with respect to a surface normal of the weld puddle, may lead to variations in the weld process with a deteriorated weld result. It is believed that variations in the height of the work piece has an influence of where the cold wire will enter the weld puddle in relation to an extension of the consumable electrode. Such a variation will have an effect on the melting rate of the cold wire and also of the peak temperature in the weld puddle. By arranging the cold wire so that it is introduced essentially orthogonally to the weld puddle a more stable welding process is achieved. It is understood that the weld puddle will be exposed to oscillations during welding. However, the upper surface of the weld puddle at quiescent undisturbed state would essentially form a plane at the point of introduction of the cold wire into the weld puddle, which plane has to a vector from the tip of a consumable electrode to the closest point of the weld puddle as a normal.

In arc welding an arc is present between the tip of the electrode and the work piece. The contact point of the arc at the work piece will be moving in a random manner. However, normally it is assumed that the arc is present within a cone from the tip of the consumable electrode to the work piece. The opening angle of the cone may vary from welding case to welding case. However, a normal opening angle may be around 30°. For this reason it is preferable to locate the cold wire such that it enters the weld puddle in an essentially orthogonal direction thereto at an axial distance being less than $L*\cos 15°$ from the consumable electrode measured at the tip of the consumable electrode.

It may be preferable to arrange the cold wire in between two consumable wires. The consumable wires may be mounted at an axial distance being less than a cone diameter of the arc measured at the surface of the weld puddle. With this arrangement, the cold wire will be introduced in the outer parts of the arc area defined by the cones of both consumable electrodes, which has shown to be beneficial for the weld result.

In preferable embodiments the feeding arrangement is arranged to feed said cold wire into said weld puddle at an angle of preferably less than 5°, still preferably less than 2° with respect to a surface normal. This corresponds to a cone having an opening angle of preferably less than 10°, still preferably less than 4°.

In a preferred embodiment the consumable electrodes as well as the cold wire are arranged in parallel and are arranged to be fed toward the weld puddle in an essentially orthogonal direction to a surface of the weld puddle.

The twin wire welding arrangement may advantageously include an electric arc-welding welding head including a contact device and a feeding portion, the contact device encompassing an electrode assembly, the electrode assembly comprising at least two consumable continuously-fed wire electrodes arranged in a contact tip. An electrically insulated duct is provided for electric insulation of a cold wire so that it is electrically insulated from the consumable electrodes in the electrode assembly in the contact device.

The electrically insulating duct includes insulated portions in wire feeder and wire straightening units, as well as guiding tubes outside the feeder and straightening units. The duct can be composed of a multitude of electrically insulating sections along the cold wire from a wire reservoir, such as a wire bobbin, to the contact device close to the workpiece to be welded. Preferably, the electric arc-welding head is employed for submerged arc welding.

Submerged arc welding can be operated as a fully-mechanized or automatic process, optionally it can be semi-automatic. Typical welding parameters are current, arc voltage and travel speed which all can affect bead shape, depth of penetration and chemical composition of the deposited weld metal from the consumable electrodes and cold wire.

The welding head may also be used for gas metal arc welding. In this event a gas cup and gas conduits for feeding the gas to the gas cup will be included in the welding head.

Favorably, the welding head is compact and allows for an independent manipulation of the at least one cold wire compared to the consumable electrodes in the electrode assembly of the welding head. The electrodes as well as the cold wire can be supplied by rear mounted wire bobbins on a so called "column and boom" arrangement. A column and boom is a rail moving manipulator which carries the welding head. The column and boom is used to position the welding head to the weld groove. The column and boom could also be designed to carry the welding equipment such as power sources, flux handling equipment and coils as known in the art of arc-welding systems. Preferably, the cold wire can be fed through a spring-loaded contact-device inside a ceramic tube. The two or more consumable electrodes and the cold wire electrode can have separate wire feeders, making this a non-synergetic set-up, offering a much wider weld parameter window compared to a synergetic set-up.

According to a favorable embodiment of the present disclosure, the electrically insulated duct can comprise an electrically insulated wire conduit in the contact device. The insulated wire conduit can be a ceramic tube arranged in the contact device. The ceramic tube can be inserted in the contact device or a part of the contact device can be treated, e.g. oxidized, to form an oxide of sufficient thickness for electrical insulation.

According to a favorable embodiment of the present disclosure, the electrically insulated duct can include an electrically insulated portion in a wire straightening unit for straightening one or more of the consumable electrodes and the cold wire. The consumable electrodes and the cold wire can be manipulated in the same wire straightening device.

According to a favorable embodiment of the present disclosure, an individual wire straightening unit can be provided for the cold wire separate from wire straightening units of the consumable electrodes of the electrode assembly. Advantageously, the cold wire can be manipulated independently from the consumable electrodes.

According to a favorable embodiment of the present disclosure, the electrically insulated duct can comprise an electrically insulated portion in a wire feeder unit for feeding consumable electrodes and the cold wire towards a workpiece. The consumable electrodes and the cold wire can be manipulated in the same wire feeder device.

According to a favorable embodiment of the present disclosure, an individual wire feeder unit can be provided for the cold wire separate from wire feeding units of the consumable electrodes of the electrode assembly. Advantageously, the cold wire can be manipulated independently from the consumable electrodes.

According to a favorable embodiment of the present disclosure, an individual speed control unit can be provided for the cold wire separate from speed control unit of the consumable electrodes of the electrode assembly. Advantageously, the cold wire can be manipulated independently from consumable electrodes.

Favorably, the cold wire can be fed independently from the consumable electrodes in the contact device. This allows for a comfortable control of the welding process. The cold wire electrode can be fed with a different speed, particularly with a variable speed and/or with a different diameter, independent from the consumable electrodes in the contact device.

According to a favorable embodiment of the present disclosure, the cold wire in the electrically insulated duct can be arranged in sequential order between a leading and a trailing consumable electrode with respect to a welding direction on a workpiece. The order of the cold wire can be used to adjust the welding deposition rate. Such a symmetric arrangement can yield very high deposition rates. The sequential order of the cold wire can be chosen depending on welding requirements.

According to a favorable embodiment of the present disclosure, the cold wire in the electrically insulated duct can be arranged upstream of the consumable electrodes of the electrode assembly with respect to a welding direction on a workpiece. Depending on welding requirements, the sequential order of the cold wire can be chosen. The outermost consumable electrodes can be tilted to a desired angle compared to the other electrodes. An asymmetric arrangement particularly allows adjusting such an angle in a straightforward manner.

According to a favorable embodiment of the present disclosure, the cold wire in the electrically insulated duct can be arranged downstream of the other electrodes of the electrode assembly with respect to a welding direction on a workpiece. The sequential order of the cold wire can be chosen depending on welding requirements.

According to a favorable embodiment of the present disclosure, a feeder unit and/or a straightening unit for the consumable electrodes can provide a feedthrough for guiding the cold wire through the feeder unit. Favorably, the cold wire can pass in the feedthrough through the wire straightening unit or the wire feeder unit without interacting with these units or the consumable electrodes. The cold wire can be manipulated independently from the consumable electrodes in the same contact device of the same welding head.

According to another aspect of the present disclosure, a welding head assembly is proposed that can include at least two electric arc-welding welding heads, at least one of which includes a contact device and a feeding portion, the contact device encompassing an electrode assembly, wherein the electrode assembly includes at least two consumable, continuously-fed wire electrodes arranged in a contact device. An electrically insulated duct is provided for electric insulation of at least one cold wire so that the cold wire is electrically insulated from the consumable electrodes of the electrode assembly. Favorably, such a welding head assembly is a powerful tool for very high deposition rates with reduced heat impact on workpieces. The welding quality can thus be improved.

According to a favorable embodiment of the present disclosure, a first welding head can be arranged in sequential order before a second welding head so that the electrode assemblies of each welding head are aligned along a welding direction during a welding operation in sequential order. The welding head according to the invention allows for a large degree of freedom when designing such a welding head assembly.

According to a favorable embodiment of the present disclosure, an order of the cold wire in each electrode assembly can be the same for each welding head with respect to the consumable electrodes in each electrode assembly. The welding head according to the invention allows for a large degree of freedom when designing such a welding head assembly.

According to a favorable embodiment of the present disclosure, an order of the cold wire in one electrode assembly can be reversed with respect to an order of the cold wire in another electrode assembly of the welding head arrangement. The welding head according to the invention allows for a large degree of freedom when designing such a welding head assembly.

According to a favorable embodiment of the present disclosure, each cold wire can be provided with a wire straightening unit and/or a wire feeder unit separate from wire straightening units and/or feeder units of the consumable electrodes of the electrode assemblies. The cold wires can be manipulated independently from the consumable electrodes and independently in each welding head, thus providing a large degree of freedom in adapting welding parameters for particular welding requirements imposed by material and/or geometry and/or ambient conditions of the workpieces to be welded.

According to another aspect of the present disclosure, an electric arc-welding contact device for an electric arc-welding head and/or a welding head assembly is proposed, including a device body and an electrically insulated portion for guiding a cold wire in an electrically insulated way through the contact device and at least two ducts for at least two consumable electrodes which are in electrical contact with the device body. Favorably, a contact device is provided where one or more cold wires can be employed together with two or more consumable electrodes. The two or more consumable electrodes can be provided for being consumed in arcs during welding whereas the cold wires are not consumed by arcs but are intended to melt in the weld pool during welding. The cold wire can be used with various diameters chosen independently from the consumable electrodes in the contact device.

According to a favorable embodiment of the present disclosure, the electrically insulated portion can comprise an electrically insulating tube. An electrically insulating tube can be easily inserted into the device body. Expediently, the tube can be made of ceramics which provides superior electrical insulation as well as a good heat resistance.

According to a favorable embodiment of the present disclosure, the device body can be composed of a main part and a removable part which can be attached to the main part. An arrangement of the consumable electrodes and the cold wire in a desired sequential order can be easily achieved or changed.

According to a favorable embodiment of the present disclosure, a tip can be provided at one end of the device body which has recesses for receiving the electrically insulating portion for cold wire and ducts for other electrodes. Favorably, the recesses for the consumable electrodes and the electrically insulating portion can be arranged in the grooves of the tip in a defined way and held securely during operation.

According to a favorable embodiment of the present disclosure, the electrically insulating portion can be arranged in a symmetric position between ducts for the consumable electrodes. Favorably, the electrically insulated portion for guiding the cold wire can be arranged between two ducts of the consumable electrodes. Such a symmetric arrangement provides a high deposition rate during welding.

According to a favorable embodiment of the present disclosure, the electrically insulating portion can be arranged in an eccentric position in relation to ducts for the consumable electrodes in the device body.

According to another aspect of the present disclosure, an electric arc-welding system is provided for generating a weld pool in a workpiece, including at least one welding head or at least one welding head assembly according to any one of the features described above. A highly versatile system can be provided which allows for convenient adjustment of the welding parameters and conditions.

It is evident that more than two consumable electrodes and/or more than one cold wire may be used in a welding apparatus according to the invention. The more than two consumable electrodes and/or the more than one cold wire can be arranged in the same welding head.

The cold wire may have any cross-sectional shape, such as oval, circular, elliptic, rectangular, quadratic, triangular or any other suitable shape. The consumable electrode may in the same manner have any cross-sectional shape, such as oval, circular, elliptic, rectangular, quadratic, triangular or any other suitable shape.

The present disclosure also relates to a twin wire welding method including:
guiding a first consumable electrode through a first contact tube toward a welding area,
guiding a second consumable electrode through a second contact tube toward the welding area,
transferring a welding current to the first and second consumable electrodes from a single power source connected to the first and second consumable electrodes via said first and second contact tubes to maintain a first and a second arc respectively for the generation of a weld puddle, wherein said single power source provides a same potential at said first and second contact tubes. According to the present disclosure a cold wire is fed essentially orthogonally into said weld puddle.

In one embodiment of the present disclosure the method includes directing a protective gas flow toward the weld area common for said first and second consumable electrodes wherein a weld puddle is maintained by said first and second arc respectively under the protective gas flow.

The method may also be applied in submerged arc welding.

BRIEF DESCRIPTION OF THE DRAWINGS

The present disclosure together with the above-mentioned and other objects and advantages may best be understood from the following detailed description of the embodiments, but not restricted to the embodiments, wherein is shown schematically:

FIG. 5a-5e various views of a contact device for two consumable electrodes and one cold wire with cut open views (FIGS. 5a, 5e) and side views (FIGS. 5b, 5d) and a front view (FIG. 5c);

DETAILED DESCRIPTION OF PREFERRED EMBODIMENTS OF THE INVENTION

Figure 1:
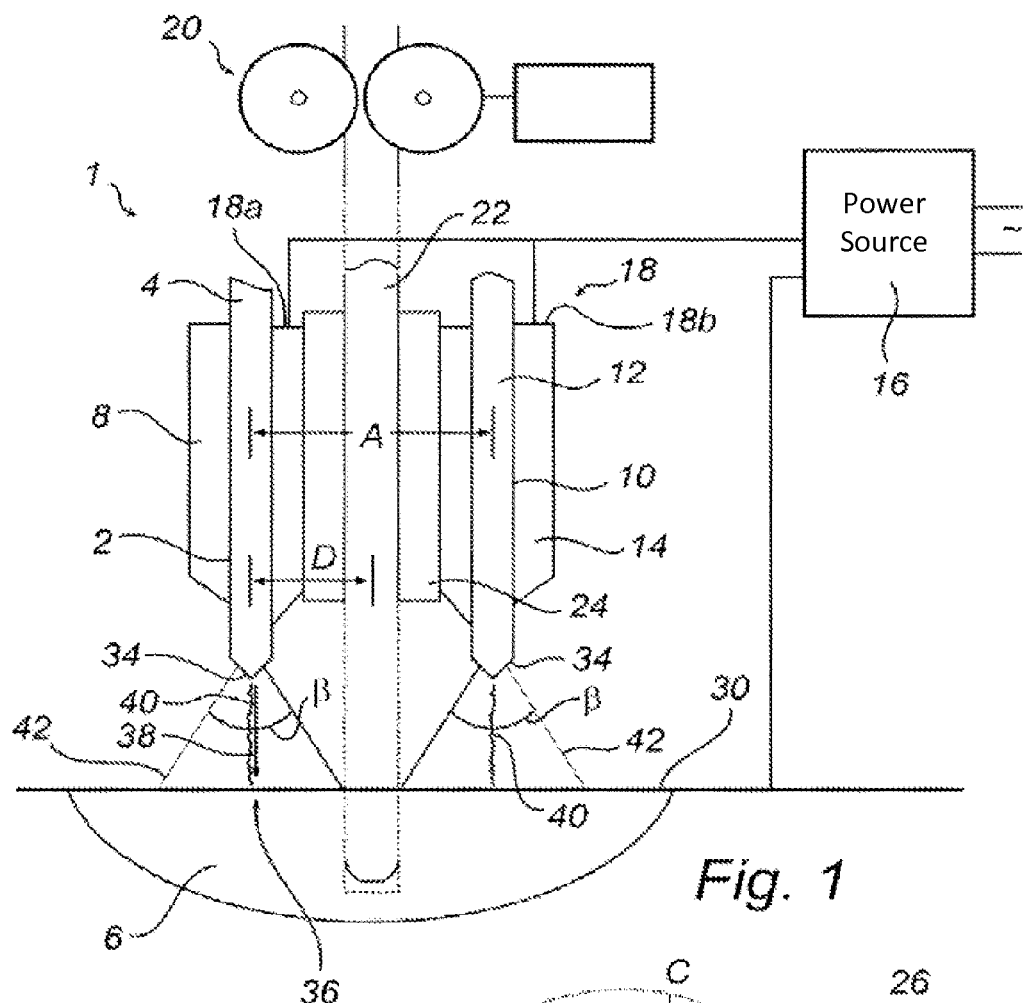
FIG. 1 a twin wire welding apparatus according to the invention.

In the drawings, equal or similar elements are referred to by equal reference numerals. The drawings are merely schematic representations, not intended to portray specific parameters of the present disclosure. Moreover, the drawings are intended to depict only typical embodiments of the present disclosure and therefore should not be considered as limiting the scope of the present disclosure.

FIG. 1 shows a schematic drawing of a twin wire welding apparatus 1 according to the present disclosure. The twin wire welding apparatus includes a first contact tube 2 for guiding a first consumable electrode 4 toward a weld puddle 6. The first contact tube 2 is arranged in a first contact tip 8 in a conventional manner. At the contact tube 2 welding current is transferred to the first consumable electrode 4. Further, a second contact tube 10 is arranged in the twin wire welding apparatus 1 for guiding a second consumable electrode 12 toward the weld puddle 6. The second contact tube 10 is arranged in a second contact tip 14 in a conventional manner. The first and second contact tips 8, 14 may be arranged in a single body, which may be aggregated by parts, or in separate bodies. At the second contact tube 10, welding current is transferred to the second consumable electrode 12.

A single power source 16 is connected to a contact device 18 including the contact tips 8, 14 and housing the first and second contact tubes 2, 10. The contact device 18 may include separate contact devices 18a, 18b or a common contact device for both contact tips 8, 14. The single power source 16 provides the same potential to the first and second consumable electrodes 4, 12. The power source may be of any conventional type operable for twin wire welding, such as a welding converter, a welding transformer, a rectifier, a thyristor controlled rectifier or an inverter.

The twin wire welding apparatus 1 further includes a feeding arrangement 20 for feeding a cold wire 22 into the weld puddle 6. The feeding arrangement includes a tube 22, which is electrically insulated from the first and second contact tips 8, 14. The cold wire 22 is fed via the tube 22. When welding, an arc will be present at the first and second consumable electrodes 4, 12, but not at the cold wire 22. The cold wire 22 is melted by introduction of the cold wire 22 into the weld puddle 6. Suitably, the cold wire 22 is not connected to any electrical power source and will therefore generally assume a ground potential. However, it may be possible to connect the cold wire 22 to a power source for pre-heating the cold wire 22. However, the cold wire 22 will not be connected to a power source for the purpose of generating an arc between the cold wire 22 and the work piece. The tube 22 may be a metallic tube that is isolated from the first and second contact tips 8, 14, or a ceramic tube as in the embodiment of a welding head as described below which is suitable for a twin welding apparatus according to the present disclosure.

Figure 1A:
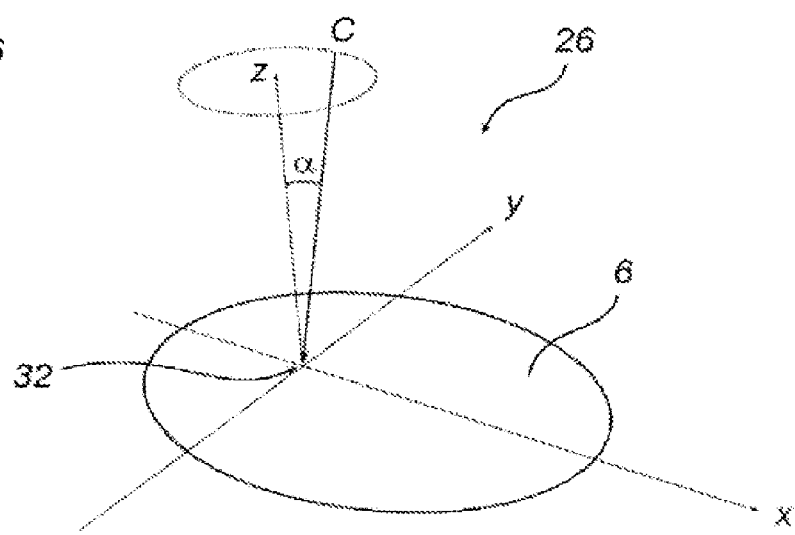
FIG. 1a a weld puddle with a coordinate system indicating a direction for feeding a cold wire into the weld puddle.

The feeding arrangement 20 for said cold wire is arranged to feed said cold wire 22 essentially orthogonally into said weld puddle. In FIG. 1A is shown a schematic drawing of a weld puddle 6 including a reference coordinate system 26. The reference coordinate system 26 indicates a welding direction x, which is the direction in which the welding head is moved relative to a work piece 28 in which a weld seam is generated. The reference coordinate system 26 further includes a transverse direction y. The welding direction and the transverse direction form a plane xy which is coplanar with an upper surface 30 of the weld puddle 6. It is known that the weld puddle 6 may be somewhat agitated during welding. The upper surface at a point of introduction 32 of the cold wire 22 is considered to be an upper surface 30 of the weld puddle 6 at the point of introduction 32 at a quiescent undisturbed state.

This upper surface 30 of the weld puddle 6 at quiescent undisturbed state would form a plane xy at the point of introduction 32 of the cold wire 22 into the weld puddle 6, which plane xy is normal to a vector 38 from the tip 34 of a consumable electrode to the closest point 36 of the weld puddle 6.

The reference coordinate system 26 includes a third direction z, which is orthogonal to the plane xy. A vector c is shown representing the direction of introduction of the cold wire 22 into the weld puddle 6. The vector c should be essentially orthogonal to the plane xy. A perfect co-alignment with the direction z is preferable, however some deviation of the direction of introduction from the direction z may be acceptable. The deviation from perfect alignment is indicated by an angle a. In embodiments of the present disclosure the feeding arrangement is arranged to feed said cold wire 22 into said weld puddle 6 at an angle of less than 15°, preferably less than 5°, still preferably less than 2° with respect to a surface normal. This corresponds to a cone having an opening angle of less than 30°, preferably less than 10°, still preferably less than 4°.

In arc welding an arc is present between the tip of the electrode and the work piece. An arc 40 is shown in FIG. 1. The contact of the arc 40 at the work piece will be moving in a random manner. However, normally it is assumed that the arc 40 is present within a cone 42 from the tip of the consumable electrode 34 to the weld puddle 6. The opening angle β of the cone 42 may vary from welding case to welding case. However, a normal opening angle β is around 30°. For this reason it is preferable to locate the cold wire 22 such that it enters the weld puddle 6 in an essentially orthogonal direction thereto at an axial distance D being less than L*cotan (β/2) from the consumable electrode measured at the tip 34 of the consumable electrode. Here L is the arc length that is the distance from the electrode tip to the closest point 36 of the weld puddle.

It may be preferable to arrange the cold wire 22 in between two consumable wires. The consumable wires may preferably be mounted at an axial distance A being less than a cone diameter d measured at the surface 30 of the weld puddle 6. With this arrangement, the cold wire 22 will be introduced in the outer parts e of the arc area defined by the cones 42 of both consumable electrodes, which has shown to be beneficial for the weld result.

The welding apparatus 1 may include a contact tube spacing mechanism for adjusting a spacing between a respective tip of said first and second contact tubes. The welding apparatus 1 may further include a contact tube inclination mechanism for adjusting an inclination between a respective length axis of said first and second contact tubes.

Figure 2:
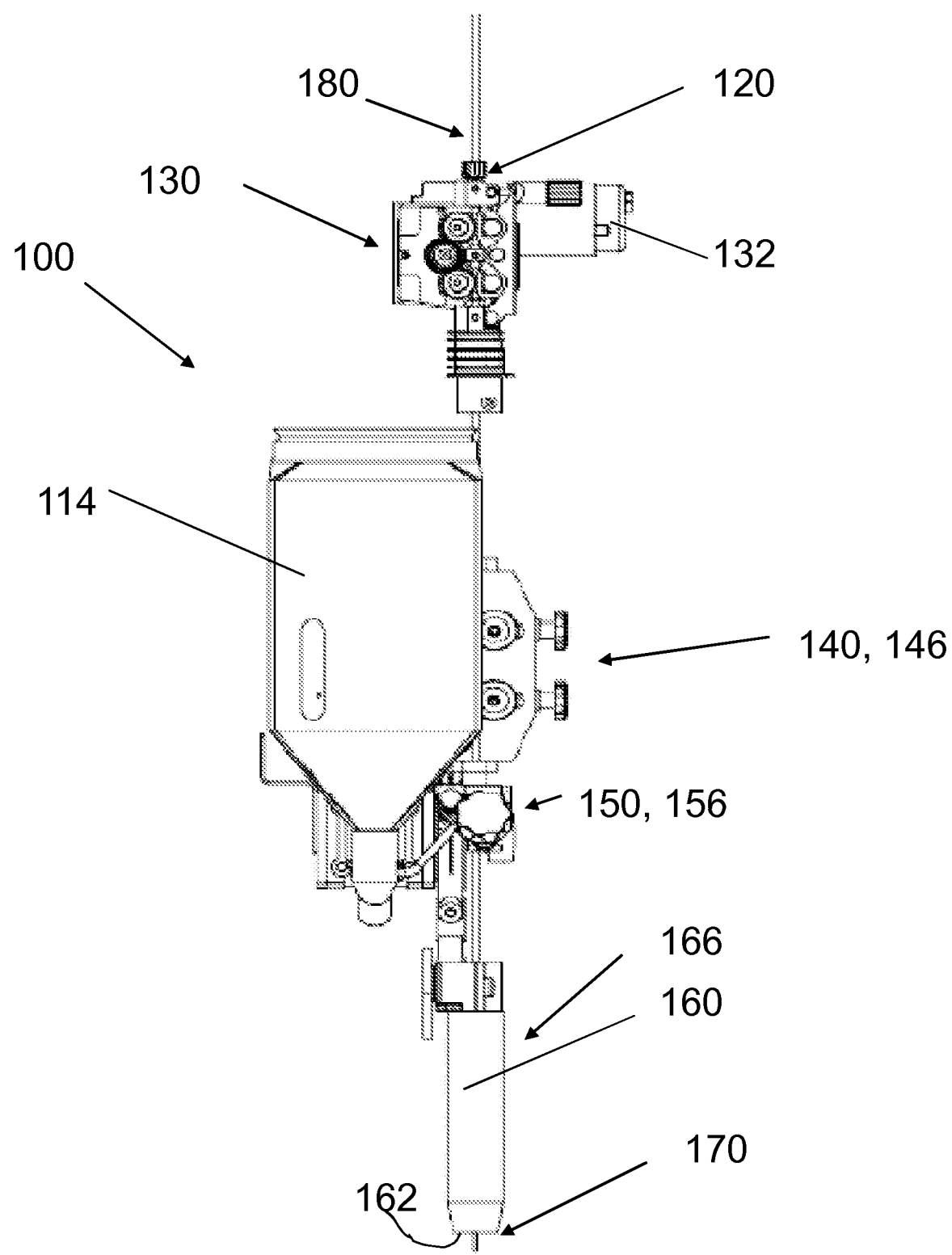
FIG. 2 a first view of an example embodiment of an arc-welding welding head according to the invention for submerged arc welding.
Figure 3:
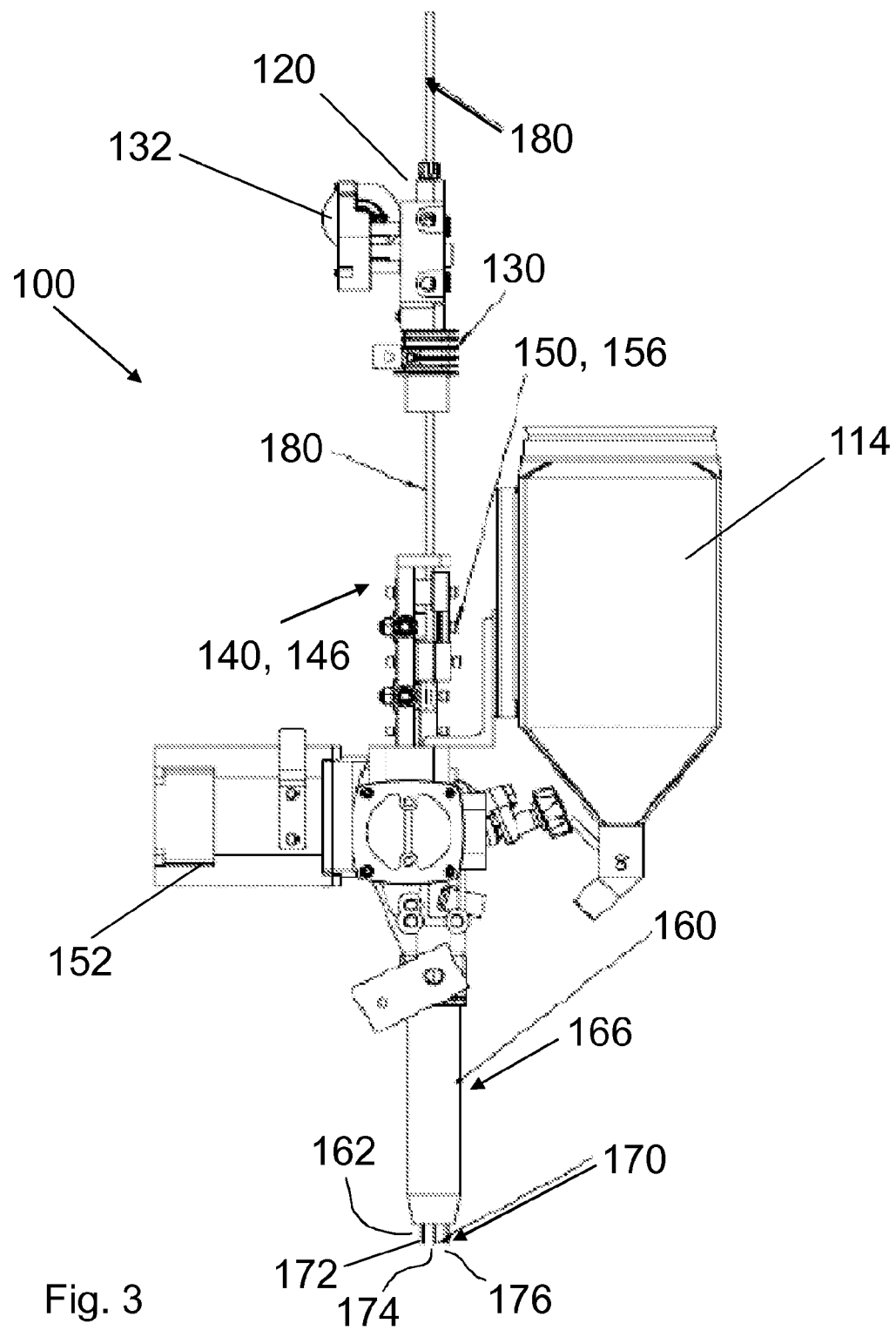
FIG. 3 the arc-welding welding head of FIG. 1 turned counterclockwise by 90°.
Figure 4:
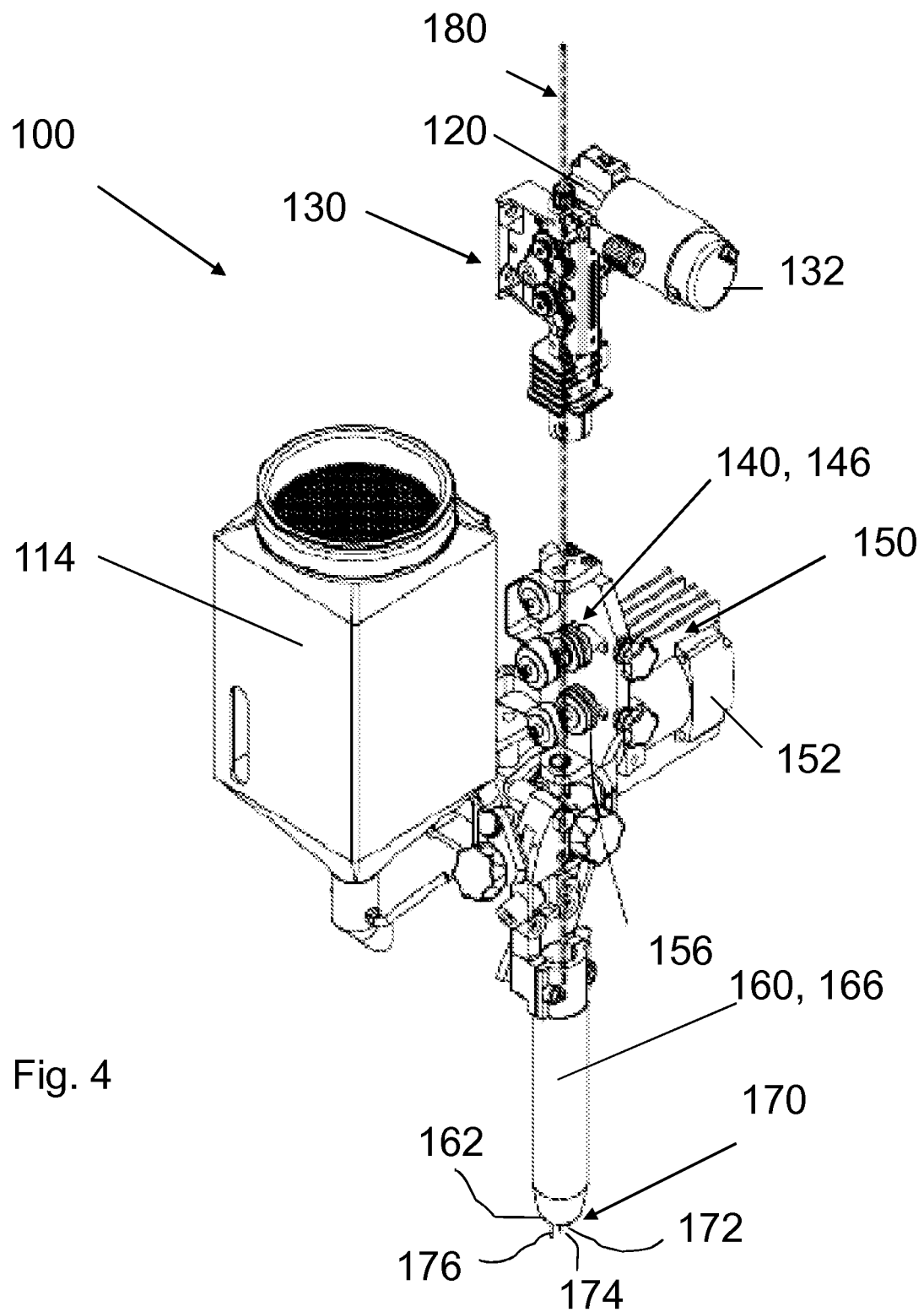
FIG. 4 a perspective view or the arc-welding head of FIG. 1.

FIGS. 2 to 4 depict different views of an example embodiment of an electric arc-welding welding head 100 according to the invention for submerged arc welding which views are described in combination.

Along its longitudinal extension the electric arc-welding welding head 100 comprises a contact device 160 at its lower end which during welding is in close proximity to the workpiece to be welded. The contact device 160 holds the electrodes 172, 176 and a cold wire 174 (FIGS. 3, 4) of the electrode assembly 170 of the welding head 100. The electrodes 172, 176 and the cold wire 174 exit the contact device 160 through an outlet 162 at the lower end of the contact device 160 which faces the workpiece during the welding operation. The electrodes 172, 176 and the cold wire 174 may be fed from respective reservoirs such as coils (not shown) towards the arc welding head 100.

The electrode assembly 170 includes by way of example two fusible continuously-fed consumable wire electrodes 172, 176 and a cold wire 174 arranged in the contact device 160. The contact device 160 comprises an electrically insulating portion 166 for the cold wire 174. Only the cold wire 174 is shown along the welding head extension. The consumable electrodes 172, 176 are only shown in the contact device 160. The consumable electrodes 172, 176 are arranged as so called twin wires preferably being fed in parallel as a double wire electrode arrangement. The electrically insulating portion 166 is preferably an extra insulated wire conduit, for instance made of heat resistant material such as ceramic.

Above the contact device 160 a feeder device 150 is arranged which feeds the electrodes and the cold wire towards the contact device 160. Typically, the feeder unit 150 comprises grooved wheels which move the wire electrodes 172, 176 (not shown in this portion for clarity reasons) towards the contact device 160. The feeder unit 150 comprises an electrically insulating portion 156 for feeding through the cold wire 174. The electrically insulating portion 156 can consist of feeder wheels with an extra insulated groove for the electrically insulated cold wire 174. The electrically insulated cold wire 174 can pass through the wire feeder unit 150 freely. The feeder wheels are driven by a driving unit 152, e.g. an electric motor.

Aside from the wire feeder unit 150 a flux hopper 114 is arranged which feeds granular flux to the contact device 160 via a nozzle (not shown) for submerged arc welding. Besides the driving unit 152 the wire feeder unit 150 comprises a gear with a drive shaft. On the drive shaft of the gear a feeding wheel 154 (FIG. 6) is arranged which can be pressurized by another wheel (not shown). The feeding wheel 154 drives the electrode forward in the direction of the contact device 160.

Above the wire feeder unit 150 a wire straightening unit 140 is arranged for straightening the consumable electrodes 172, 176. Two rollers (not referred to with reference numbers) depicted in a foremost position of the wire straightening unit 140 are used to exert a pressure on three fixed wheels arranged vertically one over the other in the rear part of the wire straightening device. The pressure the rollers are exerting on the wheels is adjustable via knobs at the outside of the wire straightening unit 140. The pressure of the rollers on the three wheels straightens the wire. The wire straightening unit 140 comprises an electrically insulating portion 146 through which the cold wire 174 can pass freely through the wire straightening unit 140.

Above the wire straightening unit 140 a separate wire feeder unit 130 is disposed for feeding the cold wire 174 towards the contact device 160. On the wire feeder unit 130 a driving unit 132, e.g. an electric motor, is arranged which drives feeder wheels of the wire feeder unit 130. Besides the driving unit 132, the wire feeder unit 130 comprises a gear with a drive shaft. On the drive shaft of the gear a feeding wheel 134 (FIG. 6) is arranged which can be pressurized by another wheel (not shown). The feeding wheel 134 drives the cold wire forward in the direction of the contact device 160.

Above the wire feeder unit 130 a separate wire straightening unit 120 is arranged for straightening the cold wire 174. Thus, along the longitudinal extension of the welding head 100 an electrically insulating duct 180 is provided for guiding the cold wire 174 from a wire reservoir such as a wire bobbin (not shown) to the contact nozzle. Between the feeder units 150 and 130 and above the wire straightening unit 120 an electrically insulated wire conduit can be arranged which receives the cold wire 174.

Particularly, the electrically insulating duct 180 consists of the electrically insulating portion 146 of the wire straightening unit 140, the electrically insulating portion 156 of the wire feeder unit 150 for the consumable electrodes 172, 176, and the electrically insulated portion 166 of the contact device 160 as well as electrically insulated wire conduits between the units 130, 140, 150, 160 and above the wire straightening unit 120 for the cold wire 174.

FIG. 5a to FIG. 5e depict various views of a contact device 160 which are described in combination. The contact device 160 encompasses a device body 161 which includes ducts for receiving the consumable electrodes and the cold wire (not shown), wherein an electrically insulated portion 166 is one of the ducts.

Figure 5D:
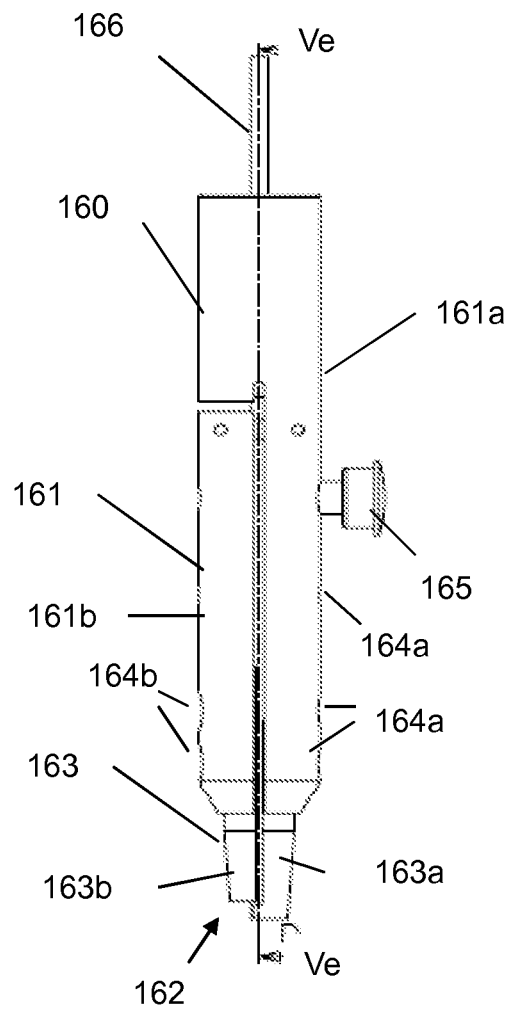
Figure 5E:
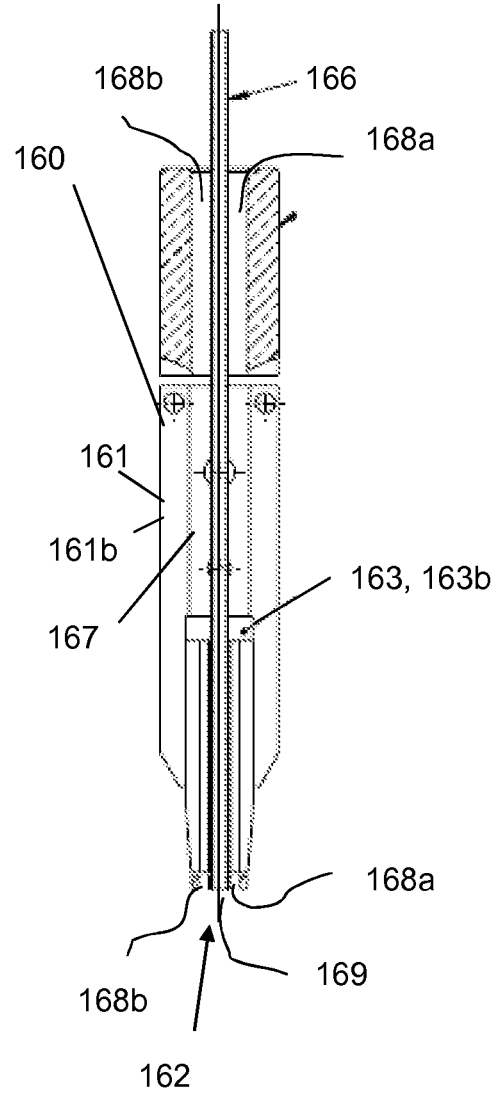

By way of example, the device body 161 is made of two parts 161a, 161b separated in the longitudinal direction where a removable part 161b is attached to the main part 161a. The main part 161a has a cylindrical upper portion and a lower portion which is slightly recessed in relation to the cut through the middle (FIG. 5a, 5e). The removable part 161b is attached to the recessed portion of the main part 161a by screws.

Alternatively, the device body 161 can be a monolithic metal body with one or more bores drilled therethrough for allowing passage of the consumable electrodes and cold wire.

Between the removable part 161b and the main part 161a remains a small free distance when the parts 161a and 161b are attached to one another. The distance allows for using various wire diameters for the consumable electrodes in the contact device 160. As the cold wire is guided separately in the electrically insulated portion 166 the diameter of the cold wire can be chosen independently from the diameters of the other electrodes in the device body 161.

The parts 161a, 161b of the device body 161 enclose a tip 163 which is composed of two parts 163a, 163b wherein part 163a is attached to the main part 161a and part 163b is attached to the removable part 161b of the device body 161. The parts 163a, 163b of the tip 163 can be attached to the main part 161a and the removable part 161b, respectively, by screws inserted in respective borings 164a, 164b provided in the main part 161a and the removable part 161b.

The tip 163 may have a smaller diameter than the rest of the device body 161 which may have predominantly a cylindrical shape. The electrically insulating portion 166 extends throughout the longitudinal extension of the contact device 166 and provides an outlet 169 for the cold wire (not shown) at an outlet 162 of the tip 163 of the contact device 160.

As can be seen in the cut open views presented in FIGS. 5a and 5e, the device body 161 has an interior section 167 with the electrically insulating portion 166 arranged in a central position, providing an electrically insulating portion for a cold wire (not shown). The electrically insulating portion 166 is preferably an insulating tube such as a ceramic tube. On both sides of the central electrically insulating portion 166a duct 168a, 168b is provided for consumable electrodes (not shown) which are intended to be consumed by arcs during welding. The ducts 168a, 168b comprise corresponding groove portions in the tip parts 163a, 163b. The groove portions form an enclosure for the consumable electrodes when the removable part 161b is attached to the main part 161a of the device body 161.

At the outside of the device body 161a bolt 165 is arranged which holds the parts 161a, 161b of the device body together by way of spring elements such as e.g. disk springs, providing a contact pressure of the parts 161a, 161b virtually independent of the actual diameter of the consumable electrodes.

An electrical contact can be attached to the contact device 160 in contact portion 164c arranged in the main part 161a of the device body 161. A wire connected to a power source can be connected to the contact portion 164c for transferring electric voltage and current to the contact device 160 so that arcs can develop at the consumable electrodes which are in close electric contact to the device body 161.

In the electrically insulating portion 166 the cold wire can pass through the contact device 160 without contacting the other electrodes (not shown).

Figure 6:
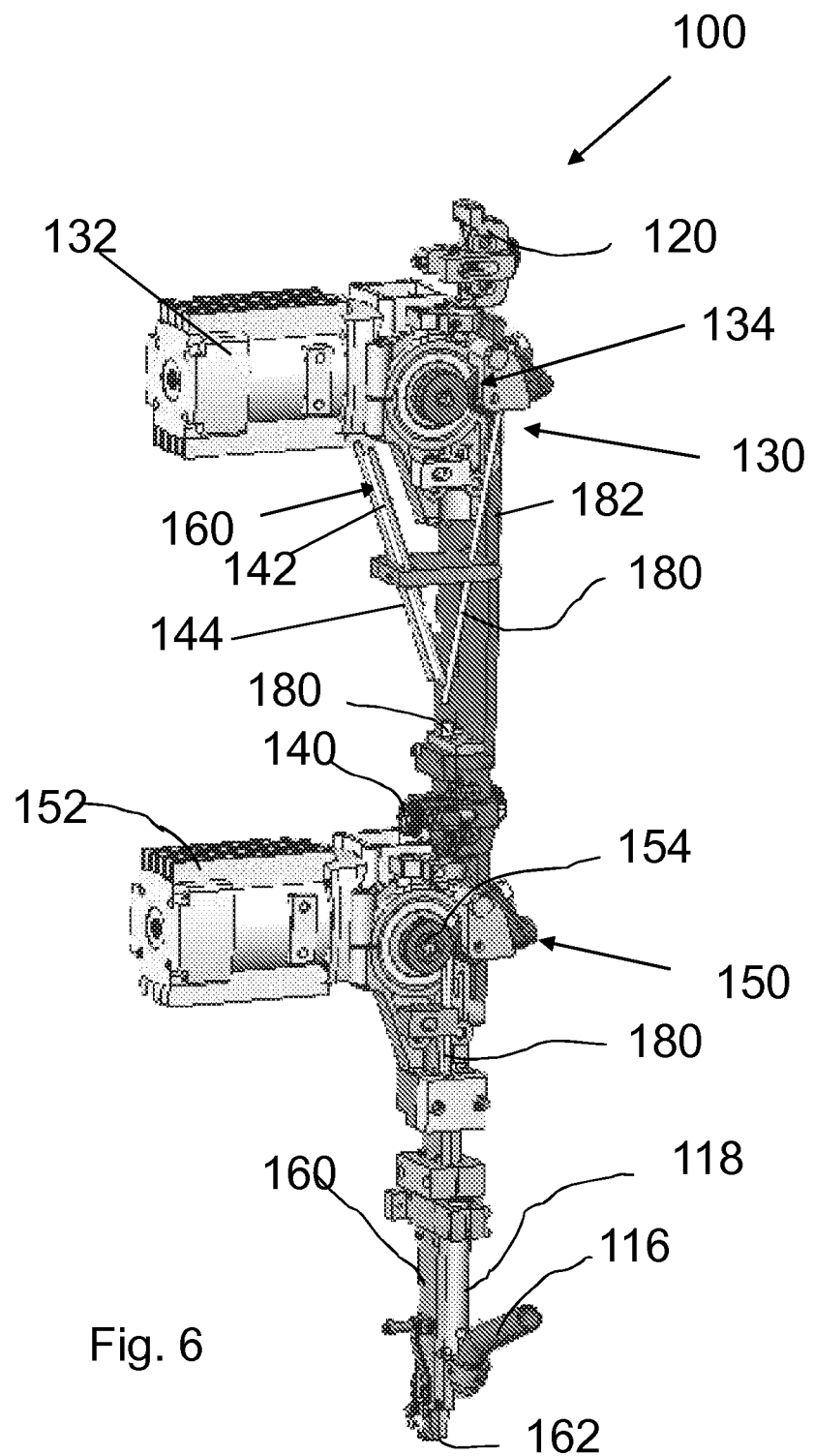
FIG. 6 a side view of an example embodiment of an arc-welding welding head

FIG. 6 is a side view of an exemplary embodiment of an arc-welding welding head 100 of virtually the same layout as shown in FIGS. 2 to 4. In order to avoid unnecessary repetitions it is referred to these drawings for a detailed description of like elements. Above the wire straightening unit 140 two guide tubes 142, 144 are provided for twin electrodes. The guide tubes 142, 144 are arranged crosswise to the longitudinal extension of the welding head 100. Between the wire feeder unit 130 for the cold wire electrode (not shown) and the wire straightening unit 140 of the consumable electrodes (not shown) a guide tube 182 for the cold wire (not shown) is arranged. The driving units 132, 152 can be equipped with pulse sensors for speed control of the electrodes. Close to the contact device 160 a nozzle 116 for a flux hopper 114 (FIGS. 2-4) is arranged, the nozzle 116 is fixed to a rod 118 arranged parallel to the longitudinal axis of the contact device 160.

Figure 7A:
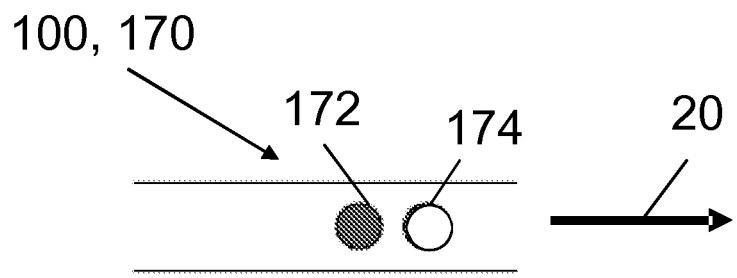
FIG. 7a-7c an arrangement of a cold wire and a consumable electrode in a first electrode assembly comprising two electrodes (FIG. 7a), a second electrode assembly comprising two consumable electrodes with the cold wire being the central electrode (FIG. 7b), and a third electrode assembly comprising two consumable electrodes with the cold wire being at the outside of the electrode assembly (FIG. 7c)
Figure 7B:
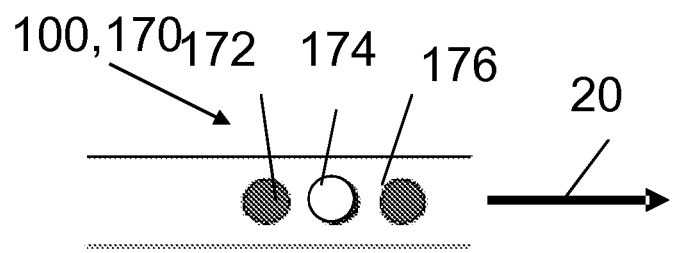
Figure 7C:
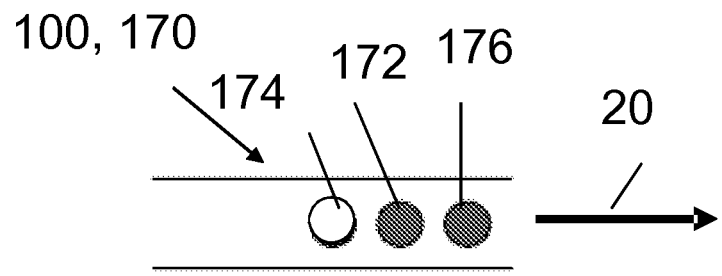

FIGS. 7a to 7c display arrangements of electrodes in electrode assemblies 170 with respect to a welding direction 20.

FIG. 7a shows a first variant of an electrode assembly 170 with an electrically insulated cold wire 174 and a non-insulated consumable electrode 172. This welding head must be combined with a further welding head to include at least two consumable electrodes as is suggested by the present disclosure. A second variant of an electrode assembly 170 is shown in FIG. 7b comprising two consumable electrodes 172, 176 and a cold wire, with the cold wire 174 being the centrally located. A third variant of an electrode assembly 170 comprising two consumable electrodes 172, 176 and a cold wire 174, with the cold wire 174 being at the outside of the electrode assembly as displayed in FIG. 7c.

Figure 8A:
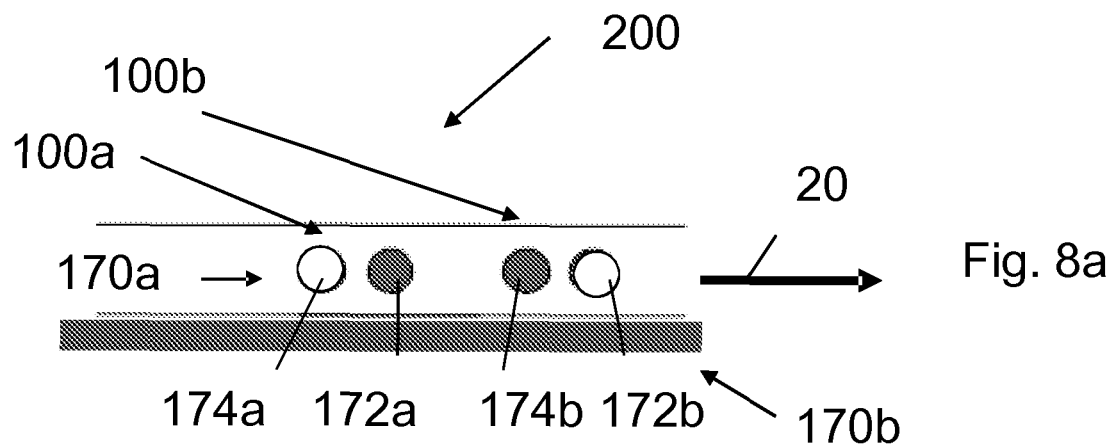
FIG. 8a-8c an arrangement of two arc-welding welding heads each comprising cold wire and a consumable electrode in a first electrode assembly comprising two electrodes in each welding head (FIG. 8a), a second electrode assembly comprising two consumable electrodes and a cold wire in each welding head, with the cold wire being the central electrode (FIG. 8b), and a third electrode assembly comprising two consumable electrodes and a cold wire in each welding head, with the cold wire being at the outside of the electrode assembly (FIG. 8c).
Figure 8B:
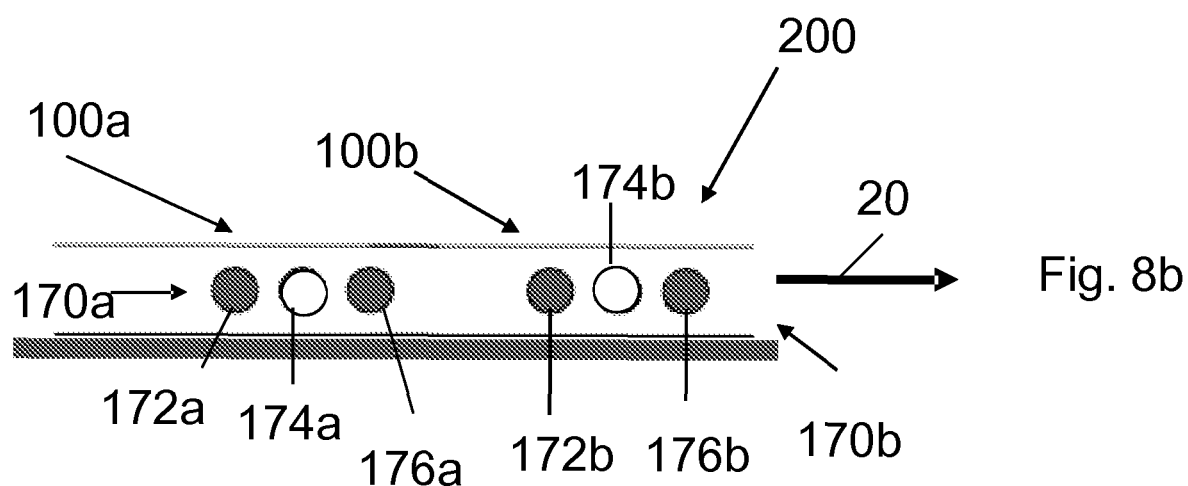
Figure 8C:
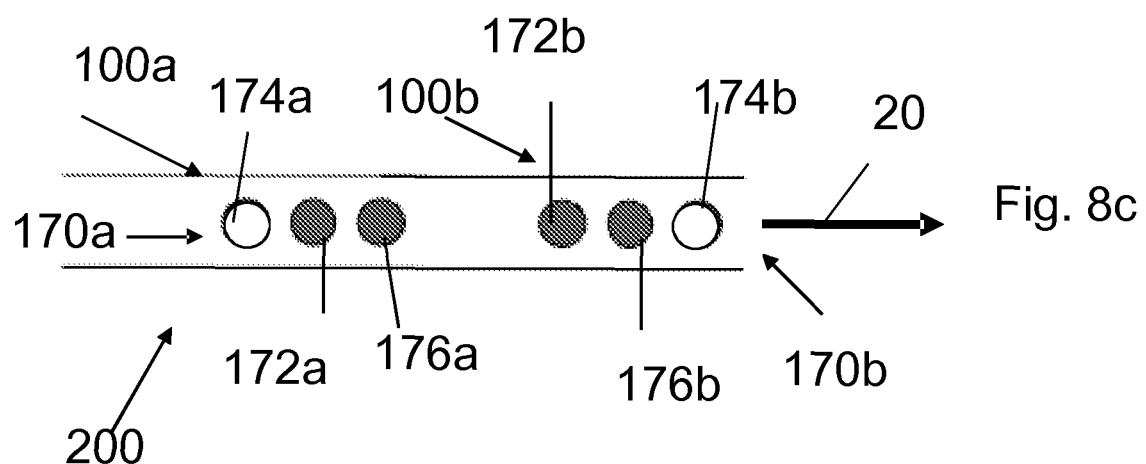

FIGS. 8a to 8c show arrangements of a welding head assembly 200 comprising two arc-welding welding heads 100a, 100b. Each welding head 100a, 100b includes an electrode assembly 170a, 170b with cold wire 174a, 174b and one or more consumable electrodes 172a, 172b. In a first variant of a welding head assembly 200 shown in FIG. 8a each welding head 100a, 100b comprises two electrodes 172a, 172b, and two cold wires 174a, 174b in each welding head 100a, 100b. The cold wires 174a, 174b are the outermost electrodes in the welding head assembly 200.

A second variant is shown in FIG. 8b, where each welding head 100a, 100b includes an electrode assembly 170a, 170b with three electrodes 172a, 176a, 172b, 176b, and two cold wires 174a, 174b, wherein the cold wire 174a, 174b is arranged in the middle between the two consumable electrodes 172a, 176a, 172b, 176b as central electrodes of each welding head 100a, 100b.

FIG. 8c shows a third variant with two consumable electrodes 172a, 176a, 172b, 176b, and two cold wires 174a, 174b, in each welding head 100a, 100b, with the cold wire 174a, 174b being at the outside of the welding head assembly 200.

The foregoing description is provided to illustrate and explain the present disclosure. However, the description hereinabove should not be considered to limit the scope of the present disclosure set forth in the claims appended here to.

What is claimed is:

1. A twin wire welding apparatus comprising:
    a first contact tube for guiding a first consumable electrode toward a weld puddle and for transferring welding current to the first consumable electrode;
    a second contact tube for guiding a second consumable electrode toward the weld puddle and for transferring welding current to the second consumable electrode;
    a power source connected to the first contact tube and the second contact tube for providing a potential to the first consumable electrode and the second consumable electrode; and
    a feeding arrangement for feeding a cold wire into the weld puddle, wherein at least one of a feeder unit and a straightening unit for the first consumable electrode and the second consumable electrode provides a feedthrough for the cold wire.

2. The welding apparatus according to claim 1, wherein the feeding arrangement is arranged to feed the cold wire into the weld puddle at an angle of less than 5° with respect to a surface normal of the weld puddle.

3. The welding apparatus according to claim 1, wherein the first contact tube and the second contact tube are formed in separate contact tips.

4. The welding apparatus according to claim 1, wherein the first contact tube and the second contact tube are both connected to single power source via separate contact devices.

5. The welding apparatus according to claim 1, further comprising a contact tube spacing mechanism for adjusting a spacing between a first tip of the first contact tube and a second tip of the second contact tube.

6. The welding apparatus according to claim 1, further comprising a contact tube inclination mechanism for adjusting an inclination between respective length axes of the first contact tube and the second contact tube.

7. The welding apparatus according to claim 1, the first contact tube, the second contact tube, and the electrically insulated duct are contained in an electrode housing.

8. The welding apparatus according to claim 1, wherein the electrically insulated duct comprises a ceramic tube.

9. The welding apparatus according to claim 1, wherein the electrically insulated duct comprises an electrically insulated portion in the straightening unit for straightening one or more of the first consumable electrode, the second consumable electrode, and the cold wire.

10. The welding apparatus according to claim 1, wherein the feeder unit of the feeding arrangement includes the feedthrough and the feeding arrangement further comprises:
    an individual wire straightening unit for the cold wire that is separate from the straightening unit.

11. The welding apparatus according to claim 1, wherein the electrically insulated duct comprises an electrically insulated portion in the feeder unit for feeding one or more of the first consumable electrode, the second consumable electrode, and the cold wire towards the workpiece.

12. The welding apparatus according to claim 1, wherein the straightening unit of the feeding arrangement includes the feedthrough and the feeding arrangement further comprises:
    an individual wire feeder unit for the cold wire that is separate from the feeder unit.

13. The welding apparatus according to claim 1, wherein an individual speed control unit is provided for the cold wire separate from a speed control unit associated with the first consumable electrode and the second consumable electrode.

14. The welding apparatus according to claim 1, wherein the welding apparatus is a gas metal arc welding apparatus including a gas cup for directing a protective gas flow toward the weld puddle.

15. The welding apparatus according to claim 1, wherein the cold wire is positioned between the first consumable electrode and the second consumable electrode with respect to a welding direction on a workpiece.

16. The welding apparatus according to claim 1, wherein the cold wire is arranged upstream of the first consumable electrode and the second consumable electrode with respect to a welding direction on a workpiece.

17. The welding apparatus according to claim 1, wherein the cold wire is arranged downstream of the first consumable electrode and the second consumable electrode with respect to a welding direction on a workpiece.

18. A twin wire welding method comprising:
guiding a first consumable electrode through a first contact tube toward a welding area;
guiding a second consumable electrode through a second contact tube toward the welding area; and
transferring a welding current from a power source to the first consumable electrode via the first contact tube to maintain a first arc for generation of a weld puddle;
transferring the welding current from the power source to the second consumable via the second contact tube to maintain a second arc for the generation of the weld puddle; and
feeding a cold wire through an electrically insulated duct into the weld puddle with a feeding arrangement, wherein the first contact tube, the second contact tube, tubes and the electrically insulated duct are contained in an electrode housing.

19. The method for welding according to claim 18, further comprising directing a protective gas flow toward the weld puddle, so that the weld puddle is maintained under the protective gas flow.

20. A twin wire welding apparatus comprising:
a first contact tube for guiding a first consumable electrode toward a weld puddle and for transferring welding current to the first consumable electrode;
a second contact tube for guiding a second consumable electrode toward the weld puddle and for transferring welding current to the second consumable electrode;
a power source connected to the first contact tube and the second contact tube for providing a potential to the first consumable electrode and the second consumable electrode; and
a feeding arrangement for feeding a cold wire through an electrically insulated duct into the weld puddle, wherein the first contact tube, the second contact tube, tubes and the electrically insulated duct are contained in an electrode housing.

21. The welding apparatus according to claim 20, wherein the welding apparatus is a gas metal arc welding apparatus including a gas cup for directing a protective gas flow toward the weld puddle.

22. The welding apparatus according to claim 20, wherein the feeding arrangement is arranged to feed the cold wire into the weld puddle at an angle of less than 5° with respect to a surface normal of the weld puddle.

23. The welding apparatus according to claim 20, wherein the first contact tube and the second contact tube are formed in separate contact tips.

24. The welding apparatus according to claim 20, wherein the first contact tube and the second contact tube are both connected to single power source via separate contact devices.

25. The welding apparatus according to claim 20, further comprising at least one of:
a contact tube spacing mechanism for adjusting a spacing between a first tip of the first contact tube and a second tip of the second contact tube; or
a contact tube inclination mechanism for adjusting an inclination between respective length axes of the first contact tube and the second contact tube.

26. The welding apparatus according to claim 20, wherein the electrically insulated duct comprises a ceramic tube.

27. The welding apparatus according to claim 20, wherein the electrically insulated duct comprises at least one of:
an electrically insulated portion in a wire straightening unit for straightening one or more of the first consumable electrode, the second consumable electrode, and the cold wire; or
an electrically insulated portion in a wire feeder unit for feeding one or more of the first consumable electrode, the second consumable electrode, and the cold wire towards a workpiece.

28. The welding apparatus according to claim 20, further comprising at least one of:
an individual wire straightening unit for the cold wire that is separate from wire straightening units of the first consumable electrode and the second consumable electrode; or
an individual wire feeder unit for the cold wire that is separate from wire feeding units of the first consumable electrode and the second consumable electrode.

29. The welding apparatus according to claim 20, wherein an individual speed control unit is provided for the cold wire separate from a speed control unit associated with the first consumable electrode and the second consumable electrode.

30. The welding apparatus according to claim 20, wherein the cold wire is positioned between the first consumable electrode and the second consumable electrode with respect to a welding direction on a workpiece.

31. The welding apparatus according to claim 20, wherein the cold wire is arranged upstream of the first consumable electrode and the second consumable electrode with respect to a welding direction on a workpiece.

32. The welding apparatus according to claim 20, wherein the cold wire is arranged downstream of the first consumable electrode and the second consumable electrode with respect to a welding direction on a workpiece.

33. The welding apparatus according to claim 20, wherein at least one of a feeder unit and a straightening unit for the first consumable electrode and the second consumable electrode provides a feedthrough for the cold wire.

34. A twin wire welding method comprising:
guiding a first consumable electrode through a first contact tube toward a welding area;
guiding a second consumable electrode through a second contact tube toward the welding area; and
transferring a welding current from a power source to the first consumable electrode via the first contact tube to maintain a first arc for generation of a weld puddle;
transferring the welding current from the power source to the second consumable via the second contact tube to maintain a second arc for the generation of the weld puddle; and
feeding a cold wire into the weld puddle with a feeding arrangement including a feeder unit and a straightening unit for the first consumable electrode and the second consumable electrode, wherein at least one of the feeder unit and the straightening unit provides a feedthrough for the cold wire.

35. The method for welding according to claim 34, further comprising directing a protective gas flow toward the weld puddle, so that the weld puddle is maintained under the protective gas flow.

* * * * *